United States Patent [19]
Bedi

[11] Patent Number: 5,094,201
[45] Date of Patent: * Mar. 10, 1992

[54] MAIN GALLERY-FILTER CONNECTION
[75] Inventor: Ram D. Bedi, Birmingham, Mich.
[73] Assignee: K.J. Manufacturing Co., Wixom, Mich.
[*] Notice: The portion of the term of this patent subsequent to Aug. 28, 2007 has been disclaimed.
[21] Appl. No.: 707,919
[22] Filed: May 30, 1991

Related U.S. Application Data

[63] Continuation-in-part of Ser. No. 659,030, Feb. 21, 1991, which is a continuation-in-part of Ser. No. 516,243, Apr. 27, 1990, Pat. No. 5,062,398.
[51] Int. Cl.$^5$ ............................................. F01M 11/04
[52] U.S. Cl. .......................... 123/196 R; 123/196 A; 184/1.5
[58] Field of Search ........... 123/196 R, 196 A, 196 S; 184/1.5

[56] References Cited

U.S. PATENT DOCUMENTS

| | | | |
|---|---|---|---|
| 2,158,914 | 5/1939 | Rinehart | 184/1.5 |
| 2,249,303 | 7/1941 | Smith | 184/1.5 |
| 2,320,048 | 5/1943 | Parson | 184/1.5 |
| 2,366,073 | 12/1944 | Vallerie | 134/21 |
| 2,425,848 | 8/1947 | Vawter | 210/62 |
| 2,454,585 | 11/1948 | Alderman | 134/13 |
| 2,554,389 | 5/1951 | Sterens | 134/167 |
| 2,594,779 | 4/1952 | Huffman | 184/1.5 |
| 3,033,311 | 5/1962 | Edgar et al. | 184/1.5 |
| 4,095,673 | 6/1978 | Takeuchi | 184/1.5 |
| 4,151,823 | 5/1979 | Grosse et al. | 123/196 A |
| 4,674,456 | 6/1987 | Merritt | 123/196 S |
| 4,676,206 | 6/1987 | DeGrazia, Jr. | 184/1 5 |
| 4,776,431 | 11/1988 | Poling | 184/1.5 |
| 4,807,674 | 2/1989 | Sweet | 141/59 |
| 4,854,277 | 8/1989 | Kenney | 123/196 A |
| 4,884,660 | 12/1989 | Bedi | 184/1.5 |
| 4,901,693 | 2/1990 | DeGrazia, Jr. | 184/1.5 |
| 4,909,205 | 3/1990 | Bewley, III | 184/1.5 |
| 4,938,315 | 7/1990 | Ohta et al. | 184/1.5 |
| 4,951,784 | 8/1990 | Bedi | 184/1.5 |
| 4,964,373 | 10/1990 | Bedi | 184/1.5 |
| 4,977,928 | 12/1990 | Batrice | 184/1 5 |

OTHER PUBLICATIONS

Valvoline's Progressive Oil Sample Testing Program; The Key to Solving Problems Before They Happen Publication Date Unknown but at Least as Early as 5-8-89.
Auto-Matic Oil Changer Advertisement Carol Wright Gifts ® 1990.
Fluid Evacuators Promotional Literature Publication, date known.
National Petroleum News-Sep. 1989, Why Quick Lube Outlets Are Grabbing Market Share.
The National Oil & Lube News NY Fast Lube Is Industry Innovator, 11/1989.
National Oil & Lube News-11/1989, European Evacuation Method Enters USA.

*Primary Examiner*—E. Rollins Cross
*Assistant Examiner*—Erick Solis
*Attorney, Agent, or Firm*—Basile and Hanlon

[57] ABSTRACT

A first pump can withdraw waste fluid from an oil pan reservoir and optionally, can be used to introduce flushing fluid through the oil filter and internal oil lubrication distribution passage system, to recirculate the flushing fluid within the internal oil lubrication distribution passage system, to withdraw the waste flushing fluid from the oil pan reservoir for disposal and storage in an external storage receptacle. An air purge connection is provided for evacuating fluid retained within the oil filter element and any fluid remaining in the internal oil lubrication distribution passage system into the oil pan reservoir prior to withdrawal of the fluid by the first pump. A second pump is provided for supplying fresh motor oil from an external storage receptacle through the oil filter directly to the oil filter inlet and onto the main gallery of the internal oil lubrication distribution passage system. A special internal engine connector is provided in the engine at a point upstream of the oil filter. This provides a central, easily accessible location within the engine compartment for connection to the oil changing apparatus. A drain plug adapter is connectible to the oil pan reservoir to provide connection to the first pump. Methods for removing waste or spent fluid and introducing fresh fluid through the oil filter element and internal oil lubrication distribution passage system, and for introducing, recirculating and removing flushing fluid from the internal oil lubrication distribution passage system are also disclosed.

14 Claims, 2 Drawing Sheets

MAIN GALLERY-FILTER CONNECTION

This is a continuation-in-part of U.S. application Ser. No. 07/659,030 filed Feb. 21, 1991, which is a continuation-in-part of U.S. application Ser. No. 07/516,243, filed Apr. 27, 1990, now U.S. Pat. No. 5,062,398.

FIELD OF THE INVENTION

The invention relates to an apparatus for changing motor oil in an internal combustion engine having an oil pan or similar oil reservoir. Such reservoirs can be found in automobiles, trucks, tractors, heavy earth moving equipment, military equipment, or the like. More particularly, this invention relates to methods in which spent or dirty oil is expediently removed from the oil pan, the lubrication passages thereafter optionally flushed with flushing fluid to remove contaminants, and then the lubrication system is refilled through the oil filter with filtered oil and lubrication passages with fresh filtered motor oil to leave a fresh engine oil lubricant film before the engine is started.

BACKGROUND OF THE INVENTION

The benefits of routine oil changes in an internal combustion engine are well known. Routine oil changes have been shown to increase engine life and performance. With repeated prolonged use, motor oil builds up suspended particles, metallic and non-metallic, from the abrasive and adhesive wear of engine parts against one another and from products of incomplete combustion and improper air intake. The particles in turn cause abrasive wear of the engine bearings, piston rings and other moving parts and the reduction of the motor oil lubricity as various additives and lubricating components become depleted. This adversely affects engine performance and if left unchanged can destroy or cripple the engine performance.

It is recommended by at least one oil manufacturer that the level of total solid concentration be limited to levels below 3.0% with levels of silica being present in amounts lower than 25 parts per million and sodium in amounts lower than 200 parts per million. To obtain satisfactory engine performance, and maintain solids concentration levels in the motor oil lower than the recommended 3.0%, changing the motor oil in an internal combustion engine is a necessary, but an undesirable, dirty and time-consuming task.

In currently designed vehicles, the oil pan serves the purpose of a reservoir for circulation of engine oil. Engine lubrication is generally accomplished through a gear-type pump. The pump picks up engine oil from the oil pan sump, where oil is drawn up through the pick-up screen and tube, and passed through the pump to the oil filter. The oil filter is generally a full flow paper element unit.

In some vehicles, an oil filter bypass is used to insure adequate oil supply, should the filter become plugged or develop excessive pressure drop. Oil is routed from the filter to the main oil gallery. The oil gallery supplies valve train components with oil, and by means of intersecting passages, supplies oil to the cam shaft bearings and other moving parts. Oil draining back from the rocker arms is directed, by cast dams in the crank case casting, to supply the cam shaft lobes. Oil also drains past specific hydraulic lifter flats to oil cam shaft lobes directly.

The passages supplying oil to the cam shaft bearings also supply the crank shaft main bearings through intersecting passages. Oil from the crank shaft main bearings is supplied to the connecting rod bearings by means of intersecting passages in the crank shaft. The front cam bearing can include a slot on its outside diameter to supply oil to the cam sprocket thrust face. In some engines, many internal engine parts have no direct oil feed and are supplied either by gravity or splash from other direct feed components. A bypass valve can also be disposed in the oil pick-up screen to insure adequate oil flow if the screen should become restricted. A pressure regulator valve, sometimes located in the oil pump body, maintains adequate pressure for the lubrication system and bypasses any excess back to the suction side of the pump. Oil from the pump passes through the filter before going to the engine oil galleries. In the filter, the oil passes through a filtering element where dirt and foreign particles are entrapped.

To remove the contaminated oil, the drain plug, generally located in the lowermost region of the oil pan, is opened. The spent oil containing suspended particles is conventionally permitted to flow under gravity out of the pan into a suitable receptacle. After the spent oil is removed, the plug is replaced and fresh oil is added to the engine usually through a separate opening in the engine valve cover. The process of gravity drainage does not remove all of the spent oil with its metallic and non-metallic particles which stick to the oil pan container walls, as well as engine components such as the crank shaft, connecting rods, pistons and the like which are exposed to the motor oil spray lubrication. These particles remain to be mixed with fresh motor oil. Thus the concentration of contaminants is lowered by dilution and only a part of the total contaminants are actually eliminated.

The oil change process is essentially the same whether performed at home, at service stations or at one of the various "Quick" oil change centers which have opened in recent years. The flow rate, or time required for oil drainage, is the same for each of these locations, because it is limited by the size of the drain plug aperture and the force of gravity. Service stations and other locations simplify the process of oil drainage with the use of hydraulic racks, special oil collection receptacles and the like.

However, this specialized and expensive equipment is not readily available to the typical automotive owner who may wish to change the oil in his vehicle. It has been estimated that the retail market of oil is approximately 2.83 billion quarts or approximately 700 million gallons. The do-it-yourself individual has been found to be price sensitive, and tends to distrust the quality of service stations and other oil change centers. The do-it-yourself individual typically believes that if you want a job done right, you do it yourself. However, the current design of vehicles does not lend itself to do-it-yourself oil changes in a convenient clean environmentally safe and effortless manner. Many vehicles have low ground clearance making it difficult to access the oil drain plug for removal of the spent oil, and also making it difficult to collect the oil without contaminating the surrounding environment.

Environmental protection is a prominent social issue in our present society. Therefore, it would be desirable to encourage do-it-yourself oil changers to perform this registered type of task in an environmentally safe manner. Of the total 153 million vehicles (car and pick up trucks) it is estimated that there are approximately 119 million privately owned passenger vehicles. These vehicles require approximately 360 million oil changes a year, using an average of 1.2 gallons per change based on an average oil change frequency of 2.94 times a year. This amounts to approximately 550 million gallons of motor oil a year. Of this amount, it is estimated that 70% of motor oil is installed by motorists themselves.

It is believed that pursuant to present practice, the spent oil drained by motorists finds its way into spent household containers, such as milk cartons. The household containers are closed and disposed of in the garbage which can and will finally find its way into the local waste dump. As the household container deteriorates, the oil and its contaminates will eventually seep into the surrounding ground water below the dump site. It has been estimated that 300 million gallons of oil a year seeps into U.S. soil creating serious potential ground water pollution problems. It would be desirable environmentally and economically if this oil could be collected and recycled. In order to motivate the do-it-yourself market, it is desirable in the present invention to make the collection of oil during oil changes effortless, environmentally safe, clean and inexpensive.

Conservation of energy and the trade deficit are also major issues in today's society. It is estimated that 250–360 million gallons of spent oil can now be easily collected and profitably recycled or re-refined. The price of spent oil so collected is four dollars per barrel at best, while the price of crude oil is much greater at approximately $18.00 per barrel. Recycling easily collected spent oil could decrease the trade deficit by approximately 120 million dollars, while providing a profitable recycling economy of approximately 86 million dollars per year.

Therefore, it would be desirable to provide an apparatus which accelerates removal of spent oil completely and easily from the crank case. It would also be desirable to provide a system which reduces the amount of spent oil handling as required in the conventional oil change service station. Further, it would be desirable to connect the apparatus directly to the internal combustion engine by a quick connect coupling that includes a passage directly from the apparatus into the lowermost portion of the oil pan for draining the old oil and a passage into the internal lubrication system for adding new oil. Further, it would be desirable to empty the oil passages of the old engine oil. Further, it would be desirable to empty the oil filter automatically before it is discarded. Further, it would be desirable to have the oil filter full of fresh engine oil before the engine is started. Further, it would be desirable to coat the oil passages with fresh engine oil film before the engine is started. Finally, it is desirable to provide a method which could be easily employed by all vehicle owners at a convenient location with all the benefits of the method of the present invention which encompass being environmentally safe, time saving, money saving, convenient, minimum exposure to motor oil and motor oil vapors, energy conservation, trade deficit reduction, and finally, longer lasting, better performing engines.

SUMMARY OF THE INVENTION

The present invention includes an apparatus external and separable from the internal combustion engine. The external device would be operably connectible to fresh oil storage means, flushing fluid storage means, waste oil storage means and spent flushing fluid storage means. The external apparatus preferably includes air purge means for purging fluid retained with the oil filter element and any fluid remaining in the lubrication system passages of the internal combustion engine, such that all waste fluid can be deposited within the oil pan reservoir prior to evacuation of the waste fluid by suitable pump means. The pump means of the external apparatus draws waste fluid from the oil pan reservoir for deposit in the appropriate waste storage means. In addition, the pump means is connectible to an optional flushing fluid reservoir for pressurized delivery through the pump means, oil filter element, and lubrication system passages of the internal combustion engine. Furthermore, suitable valve connections are provided for drawing flushing fluid from the oil pan reservoir for recirculation through the pump means, external filtering means, and for pressurized delivery to the oil filter element of the internal combustion engine and thereafter flowing through the lubrication system passages of the internal combustion engine before re-accumulating in the oil pan reservoir for subsequent recirculation as desired.

Upon completion of the optional flushing cycle, the valves can be operated to draw the flushing fluid from the oil pan reservoir through the pump means for deposit in the external waste flushing fluid storage means. After evacuation of the optional flushing fluid, the pump means can be connected to the fresh oil storage means for pressurized delivery of fresh motor oil through the oil filter element sending filtered fresh oil directly to the main gallery of the lubrication system passages of the internal combustion engine until the appropriate amount of filtered fresh motor oil has been delivered to the internal combustion engine.

A suitable plumbing connection is provided for connecting the external apparatus to the internal combustion engine. Plumbing connections, such as a quick connect nipple extending from a hose or metallic tubular connection, are preferred for quick connection of the external apparatus to the engine.

The present invention also includes tapping into the engine block directly into the engine oil passage (to provide external access to the filter) extending from the oil pump to the oil filter. This passage is tapped at a point just before entering the oil filter and is provided with an external opening adapted to receive plumbing connections. A suitable plumbing connection is provided for connecting the external apparatus to the internal combustion engine. Plumbing connections, such as a quick connect nipple extending from a hose or a metallic tubular connection, are preferred for quick connection of the external apparatus to the engine. The fluid flow is then carried through the oil filter and routed to the main gallery passage of the oil lubrication system. These connections eliminate unnecessary external adapter systems previously taught in U.S. application Ser. No. 07/516,243 filed Apr. 27, 1990, now U.S. Pat. No. 5,062,398 U.S. application Ser. No. 07/659,030 filed Feb. 21, 1991. Further, the elimination of these adapters directly eliminates the force of pressure required to pump the oil through the system.

The present invention eliminates or minimizes the under the hood packaging problem as posed by U.S. application Ser. Nos. 07/659,030 and 07/516,243 to accommodate direct coupling of the external apparatus to the engine oil passage as such access may already exist in the engine block. If access does exist, then it is envisioned that all that is required is suitable plumbing connections as described above.

The present invention also includes a drain line adapter. The drain line adapter is in fluid communication with the lowermost portion of the oil pan reservoir. The drain line is so located in the oil pan that it has no mechanical interference with the internal moving parts of the combustion engine. The drain line external opening is adapted to receive a plumbing connection. The tip of the drain line is located in the lowermost region of the oil pan reservoir. Externally the drain line is connected to a quick connect nozzle for draining the used engine oil and optional flush fluid.

In operation, the present invention provides a method for quickly and efficiently removing waste oil from an internal combustion engine, replenishing the lubrication system of an internal combustion engine with fresh oil, and optionally prior to replenishing the engine with fresh oil, flushing the lubrication system, including the internal passages of the engine, with a flushing fluid to remove contaminants thereby providing a cleaner environment for the fresh oil to be introduced in the engine.

Additionally, the present invention provides purging of fluid from the oil filter element of the internal combustion engine with pressurized gaseous means and preferably air means. Furthermore, all fluid introduced into the internal combustion engine first flows through the oil filter element of the internal combustion engine and then passes through the lubrication passages within the internal combustion engine prior to accumulating within the oil pan reservoir of the internal combustion engine. This provides expedient and efficient means for purging old fluid from the oil filter element and the oil passages, flushing contaminants from the internal passages of the lubrication system during the optional flushing cycle, and prelubricating the lubrication system of internal passages within the internal combustion engine and charging the oil filter with fresh fluid and charging the oil passages and oil pan with filtered fresh engine oil before starting the engine.

Other modifications, characteristics, features and benefits of the present invention will become apparent upon reading the following detailed description of the invention in conjunction with the attached drawings.

BRIEF DESCRIPTION OF THE DRAWINGS

In the following drawings, like reference numerals refer to like parts throughout the various views, wherein.

DETAILED DESCRIPTION OF THE PREFERRED EMBODIMENT

The basic process of the present invention can be employed successfully with internal combustion engines having oil reservoirs and internal oil lubrication distribution passage systems. The term "internal oil lubrication distribution passage system" is defined as, but not limited to, the machined or cast passages and circulation systems present in the engine block, cylinder head, crank shaft, cam shaft and connecting rods. Various engines will have differing lubrication requirements, and therefore, it is to be understood that every engine may not have the passages and circulation systems in all the enumerated components.

The present invention includes an oil changing apparatus, generally designated as 10, which is separable from an internal combustion engine generally designated as 12. The external, separable oil change apparatus can be seen schematically on the left hand side of FIG. 1, while the internal combustion engine 12 is shown schematically on the right hand side of FIG. 1.

As will be described in greater detail below, the present invention may include one or more plumbing adapters connected to the internal combustion engine 12 to facilitate proper connection of the external oil changing apparatus 10 to the lubrication system of the internal combustion engine 12. The one or more adapters may include an oil filter coupling adapter 14. One or more of these adapters may be required to modify existing internal combustion engines for use with the oil changing apparatus of the present invention. However, it is envisioned that at some point in time, manufacturers may modify the configuration of internal combustion engines to provide the appropriate coupling connections as required for the present invention as original equipment manufacturer's optional or standard equipment.

Specifically, it is envisioned that the internal combustion engine may be modified to include the oil coupling adapter of the present invention for easy attachment of the oil change apparatus. Therefore, in its broadest sense, the present invention may not require the adapters disclosed in this application, but rather only requires a coupling connection in fluid communication with the inlet to the filter and to the lowermost portion of the oil pan reservoir through the drain line. A filter coupling connection is provided in the present embodiment and is in fluid communication with the internal oil lubrication distribution passage system, preferably tapped directly into the engine oil passage from the oil pump to the lubrication system. It is also preferable that the coupling connections be provided with quick connect couplings as is conventional and known in the art.

Figure 1:
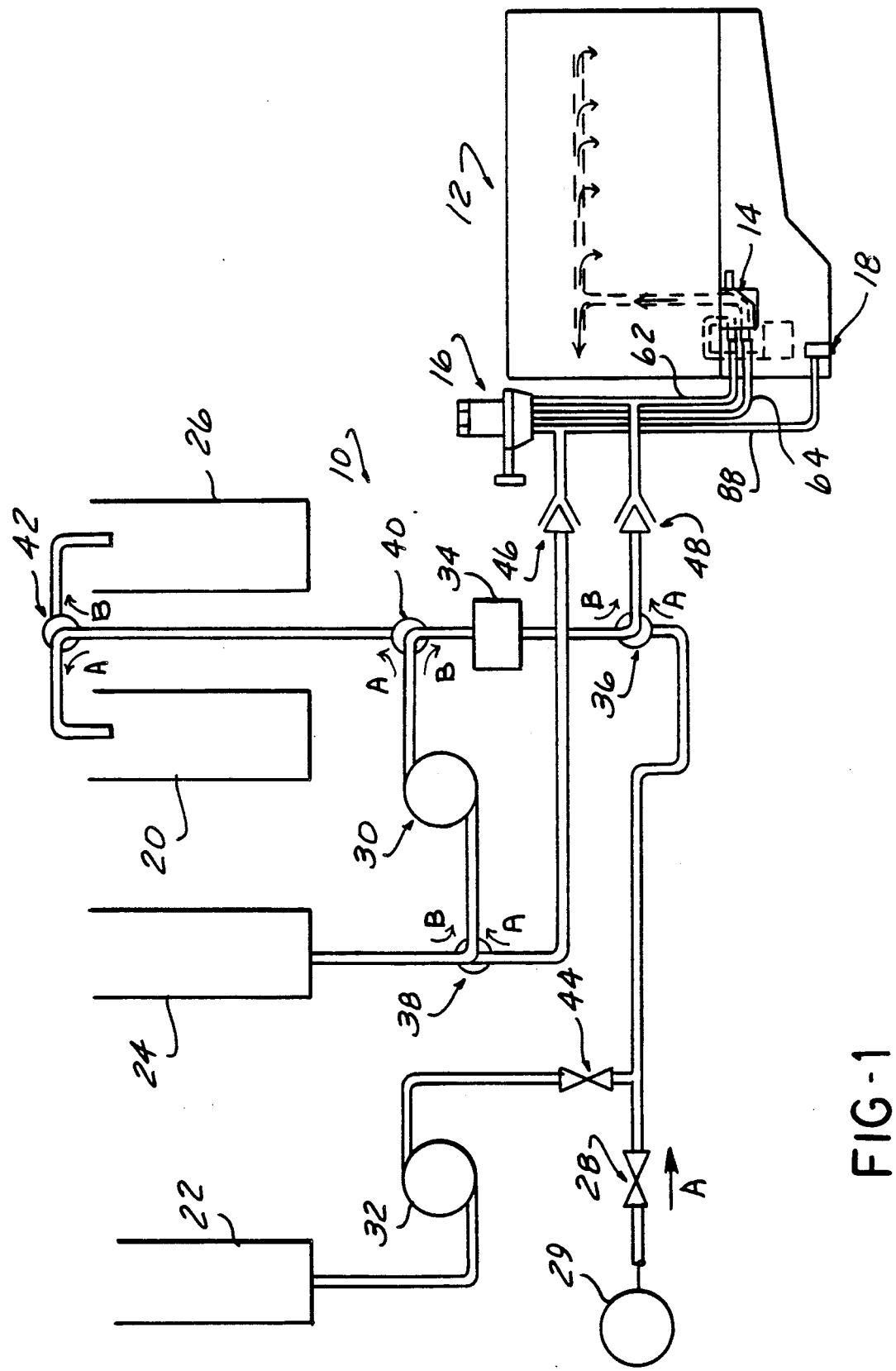
FIG. 1 is a schematic view of an oil change apparatus according to the present invention.

With reference to FIG. 1, the oil changing apparatus 10 of the present invention is connectible to a plurality of external storage means. The storage means may include a waste oil storage receptacle 20 and a fresh motor oil supply receptacle 22. In an optional configuration, the storage means may also include a flushing fluid supply receptacle 24 and a waste flushing fluid storage receptacle 26.

The oil changing apparatus 10 also includes a connection to a source of compressed air, such as pump 29. The connection to the source of compressed air is controlled by appropriate valve means 28, for opening and closing the communication of the compressed air with the oil changing apparatus 10. Of course, it is recognized that the pressure at which the compressed air is supplied through the oil changing apparatus must be controlled so that excessive pressure is not delivered to the internal oil lubrication distribution passage system and is no more than the pressure of the oil pump, of the internal combustion engine. It should be recognized that the appropriate control circuitry for regulating the pressure of the compressed air is well known to those skilled in the art of compressed air delivery systems and is commercially available. It should also be noted that the compressed air delivered to the internal oil lubrication distribution passage system should be clean and appropriately dried so that minimal or no water vapor is introduced into the internal oil lubrication distribution passage system which could thereby cause problems with rust and degradation of the oil to be introduced into the internal oil lubrication distribution passage system of the internal combustion engine.

The oil changing apparatus 10 also includes pump means for evacuating fluid from the internal combustion engine and for introducing fluid into the internal oil lubrication distribution passage system of the internal combustion engine. The pump means may also be used for recirculating fluid within the internal combustion engine by drawing fluid from the internal combustion engine fluid reservoir and discharging that fluid through the pump means into the internal oil lubrication distribution passage system.

As depicted schematically in FIG. 1, the pump means may include a first pump 30 for drawing spent oil from the oil reservoir through the drain line 88 of the internal combustion engine 12 for discharge into the waste oil storage means 20. The pump means may also include a second pump 32 for introducing fresh motor oil from the fresh motor oil storage receptacle 22 into the internal oil lubrication distribution passage system of the internal combustion engine 12. Optionally, through appropriate valve means, the first pump 30 can be interconnected for supplying flushing fluid from a flushing fluid supply receptacle 24 into the internal oil lubrication distribution passage system, and once an appropriate amount of flushing fluid has been introduced into the internal combustion engine 12, the first pump 30 can be configured by the appropriate valve means for recirculating the flushing fluid from the internal combustion engine reservoir through the internal oil lubrication distribution passage system. In addition, through the appropriate setting of the valve means, the first pump 30 can be configured to draw the spent flushing fluid from the reservoir through the drain line 88 of the internal combustion engine 12 for discharge into the waste flushing fluid storage receptacle 26.

When recirculated flushing fluid operations are desired, it is preferable to include a filter unit 34 on the discharge side of pump 30 to filter the fluid being recycled back into the internal oil lubrication distribution passage system of the internal distribution engine 12 to remove suspended particles being carried in the flushing fluid stream prior to reentering the inlet access of the filter of the internal combustion engine. The external filter 34 may be sized appropriately for the internal combustion engine being flushed, for example it may be desirable in automotive internal combustion engines to remove particles having a size equal to or greater than 5 microns. However, it should be recognized that the filtration characteristics of the filter 34 can be modified to the extent desired by the operator without adversely affecting the operation of the oil changing apparatus 10 of the present invention. It should also be recognized that through appropriate valve and fluid conduit means arrangements, the present invention can be modified to operate with only one pump, rather than a two pump configuration as schematically shown in FIG. 1. However, the two pump configuration is the preferred configuration of the present invention since it isolates the fresh motor oil from the major portion of the fluid passage conduits used for removal of the waste oil and, optional flushing fluid introduction and recycling portions of the oil change apparatus 10.

The valve means can include a plurality of directional flow control valves. As shown in FIG. 1, the directional flow control valves are designated 36, 38, 40 and 42. Each of these directional flow control valves is operable to divert flow from a first direction indicated by arrow A to a second direction indicated by arrow B.

In operation, the internal combustion engine 12 is brought into proximity with the oil changing apparatus 10. A fluid conduit hose with a first quick connect coupling 46 is connected to the appropriate outlet connection of the internal combustion engine 12 for drawing fluid from the reservoir of the internal combustion engine through the drain line of engine 12. Another hose with a second quick connect coupling 48 is connected to the connection 16 of the internal combustion engine 12 for introducing compressed air and fluid into the internal combustion engine 12 through the filter element 14 and, finally, into the internal oil lubrication distribution passage system of the internal combustion engine 12 for subsequent accumulation in the oil pan reservoir of the internal combustion engine 12.

Directional flow control valve 36 is actuated to provide flow in the arrow A direction and valve means 28 is actuated to introduce pressurized air into the system to purge fluid from the special oil filter element 14 thereby causing the residual spent oil retained within the oil filter element 14 to be discharged through the internal oil lubrication distribution passage system to the oil pan reservoir of the internal combustion engine 12. The check valve 44 prevents pressurized air from entering the second pump 32 and the fresh oil supply receptacle 22.

After completing the purging operation, control valve 28 is de-activated or closed to stop delivery of the compressed air. Directional flow control valve 38 is then operated to provide flow in the arrow A direction. Directional flow control valve 40 is also actuated to provide flow of fluid in the arrow A direction. In addition, directional flow control valve 42 is actuated to provide flow in the arrow A direction.

Pump 30 is then energized to draw fluid from the oil pan reservoir through the drain line 88 of the internal combustion engine 12 for discharge into the spent oil storage receptacle 20. After the oil pan reservoir of the internal combustion engine 12 has been emptied, the pump 30 is de-energized. The empty filter element 14 of the internal combustion engine 12 can be removed and replaced with a clean filter element during or after the emptying cycle as that has no effect on the emptying operation. Fresh oil can then be introduced into the internal oil lubrication distribution passage system by actuating directional flow control valve 36 to allow flow in the arrow A direction if required. Pump 32 is then energized to draw fresh motor oil from receptacle 22 for discharge into the internal combustion engine 12 through the oil filter element 14 into the internal oil lubrication distribution passage system for accumulation in the oil pan reservoir of the internal combustion engine 12.

When an adequate amount of fresh motor oil has been delivered to the internal combustion engine 12 by the pump 32, the pump 32 is de-energized. The quick disconnect couplings 46 and 48 are then disconnected from the internal combustion engine 12. The internal combustion engine 12 is now ready for normal use with the oil filter element having been precharged with fresh oil and engine components and oil passages and oil pan prelubricated with filtered oil prior to starting the engine.

If optional flushing of the internal oil lubrication distribution passage system is desired, this would preferably occur after removal of the spent oil from the internal combustion engine and prior to replacement of the old filter element with a new filter element. After removal of the spent oil from the internal combustion engine 12, the oil changing apparatus 10 is reconfigured using the valve means to introduce flushing fluid into the internal oil lubrication distribution passage system. Directional flow control valve 36 is operated to provide flow in the direction of arrow B. Directional flow control valve 38 is also operated to provide flow in the direction of arrow B. In addition, directional flow control valve 40 is actuated to provide flow in the direction of arrow B. This provides fluid passage means for pump 30 to draw flushing fluid from receptacle 24 for delivery to the internal oil lubrication distribution passage system and to the oil pan.

Once an appropriate amount of flushing fluid has been introduced into the internal combustion engine 12, pump 30 is de-energized temporarily to reconfigure the valves. The flushing fluid disposed within the internal combustion engine 12 can then be recirculated through the internal oil lubrication distribution passage system by operating directional flow control valve 38 to provide for flow in the direction of arrow A. This provides a closed loop recycling system for flushing the splashed component and the internal oil lubrication distribution passage system of the internal combustion engine 12 for as long as is deemed necessary by the oil changing apparatus operator.

Preferably, as previously mentioned, an external filter 34 is provided in the recirculating line to remove particles and other contaminants flushed from the internal oil lubrication distribution passage system of the internal combustion engine 12. However, it should be recognized that this is an additional precaution, since the recirculating flushing fluid is delivered from the pump 30 through the oil filter element 14 of the internal combustion engine 12. Therefore, the filter element 14 of the internal combustion engine 12 would remove a portion, if not all, of the contaminants passing therethrough prior to reentering the internal oil lubrication distribution passage system. For this reason, it is preferable to replace the old filter element of the internal combustion engine 12 after the optional flushing operations have been completed. When it is determined by the system operator that the recirculated flushing operation has continued for a sufficient period of time to clean the internal oil lubrication distribution passage system to the degree desired, the pump 30 is de-energized temporarily while reconfiguring the valve means.

In order to evacuate the spent flushing fluid from the oil pan reservoir of the internal combustion engine 12, valve 36 is operated to provide for a flow in the direction of arrow A. Valve 40 is also operated to provide for flow in the direction of arrow A. Valve means 28 is then actuated to supply pressurized air for purging fluid from the filter element of the internal combustion engine 12. The flushing fluid is purged out of the filter element 14 by the clean compressed air and passes through the internal oil lubrication distribution passage system of the internal combustion engine 12 prior to being deposited in the oil pan reservoir of the internal combustion engine 12.

After completing the purging operation, valve means 28 is actuated to close off the supply of compressed air to the oil changing apparatus 10. Pump 30 is then energized to draw fluid from the oil pan reservoir of the internal combustion engine 12 for discharge into the spent flushing fluid storage receptacle 26 through directional control valve 42 which has been operated to provide for flow in the direction of arrow B. After evacuation of the flushing fluid from the internal combustion engine 12 is complete, the remaining steps of the oil changing procedure are completed as previously described. If desired, the system is configured to permit draining and purging to be done concurrently.

The flushing fluid introduced is any material or composition which is compatible with motor oil and exhibits suitable detergency and cleaning characteristics but is inert to the oil pan, gaskets, and associated engine components. It is also preferable that the flushing fluid provide sufficient lubricity or sheeting action to enhance the sheeting action of the flushing fluid dislodging particulate contaminants and carrying them with the flushing fluid as it flows under gravity back to the oil pan. The flushing fluid employed is, preferably, one which is compatible with engine oil and is not detrimental in any subsequent waste oil recycling processes and one which does not deposit undesirable residual constituents which adhere to oil pan surfaces and engine components.

In the preferred embodiment, the flushing fluid employed in the present invention consists essentially of a hydrocarbon compatible with engine oil, a compatible detergent capable of improving the detergency of the flushing fluid and a lubricating additive capable of enhancing the sheeting action of the flushing fluid.

The hydrocarbon employed in the preferred embodiment is an organic fluid selected from the group consisting of high flash point kerosene and mixtures thereof. The flash point of the kerosene is preferably above about 150° F. (Fahrenheit). It is to be understood that other fluids having similar characteristics to high flash point kerosene may be employed in addition or substituted in the flushing fluid.

The detergent employed in the present invention is an organic fluid selected from the group consisting of butyl cellosolve, Dowfax surfactants, and mixtures thereof. These and similar surfactants are employed in sufficient concentration to provide detergency in the flushing fluid.

The lubricating additive employed in the flushing fluid is, preferably, a methyl ester having a carbon chain between 12 and 20 carbon atoms or mixtures of such methyl esters in an amount sufficient to provide lubricity and sheeting action to the flushing fluid.

In including the lubricating additive in the flushing fluid of the present invention, it was believed that the lubricating additive would impart characteristics which would increase the sheeting action and cleaning characteristics of the flushing fluid. It has been found, quite unexpectedly that the flushing fluid of the present invention also imparts a residual surface lubricity, which is advantageous in that it provides preliminary lubricant to the engine parts as newly added fresh motor oil is added and circulated through the crank case.

While a certain amount of residual spent oil and contaminants are removed merely by the mechanical scrubbing action of the circulated flushing fluid, additional amounts can be dissolved or removed due to the sheeting action of the flushing fluid as it trickles down the engine components to the oil pan reservoir, and due to the physio-chemical interaction between the residual spent oil and the flushing fluid.

Figure 2:
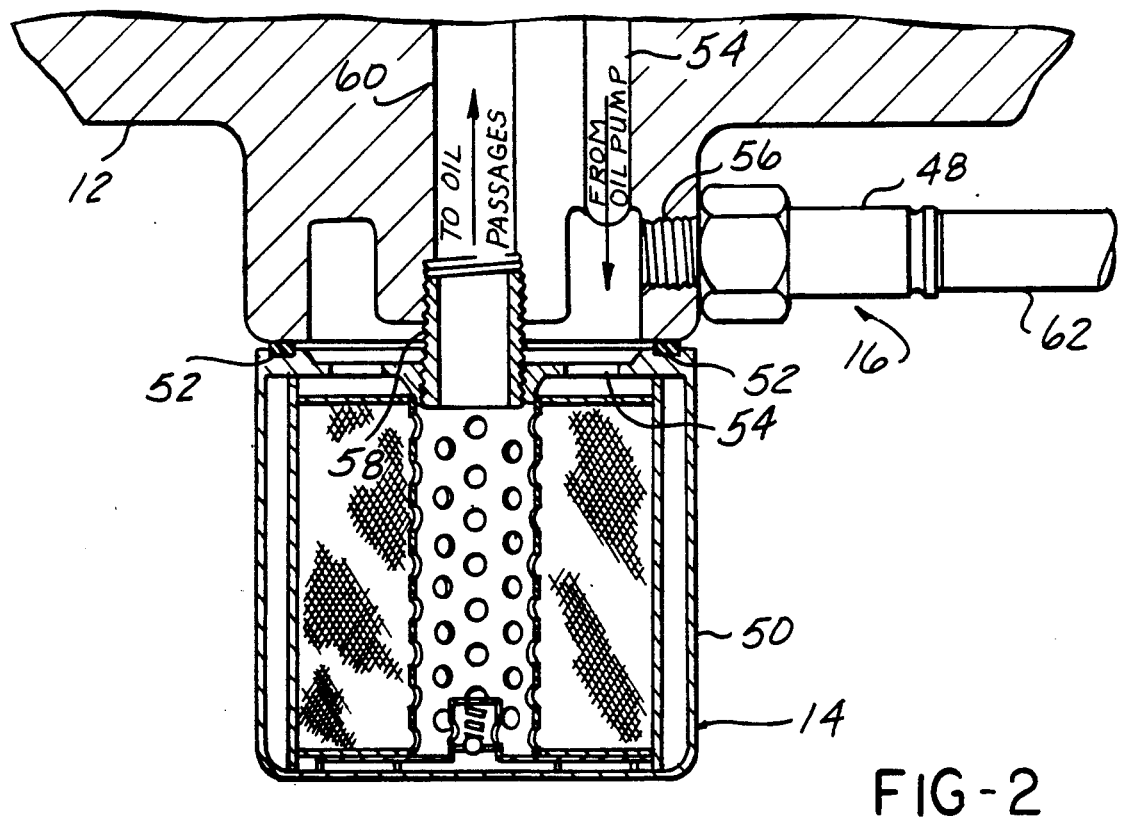
FIG. 2 is a cross-sectional view of an oil filter boss mounting and preferred access connection to the filter according to the present invention.

A special oil filter mounting and plumbing connection is shown in FIG. 2. The oil filter 14 is generally referred to as a spin on type adapter. The oil filter 14 has a generally circular first face 50. The first face 50 includes an O-ring groove 52 spaced inwardly from the outer periphery of the circular first face 50. Spaced inwardly from the O-ring groove 52 is fluid passage 54. The first fluid passage is in communication with a first external outlet fluid passage 56 adapted to receive a hose connection fitting 48 for attachment to a first hose or metallic tube 62.

An internally threaded fluid passage 58 is disposed generally in the center of the circular first face 50. The interior threads of the fluid passage 58 permit the oil filter 14 to be threadingly engaged with the oil filter mounting boss normally located on the engine block of an internal combustion engine 12. Fluid is generally delivered from the oil pump within the internal combustion engine through the first fluid passage 54 to the oil filter element 14. After passing through the oil filter element, fluid is returned to the internal combustion engine through second fluid passage 60.

Metal or hose connection coupling 48 is preferably a quick disconnect coupling unit as shown in FIG. 2. First outlet fluid passage 56 is preferably located upstream of the oil filter 14 and fluidly connects fluid passage 54 with the oil changing apparatus 10. Preferably, passage 56 may already exist within the internal combustion engine 12. Therefore, all that is required to connect the oil change apparatus 10 is the attachment of the quick disconnect coupling 48 adapted to receive a hose or metallic tubing 62.

Coupling 48 and first fluid passage 56 introduce engine oil directly into the filter 14, thereby directly precharging the filter with engine oil before the engine is started.

A second advantage of first fluid passage 56 is that it may be used to purge the filter 14 with the compressed pump air 29. The location of first fluid passage 56 also is advantageous in purging the oil passages 54, 60 of engine oil normally left behind by today's oil change methods.

Figure 3:
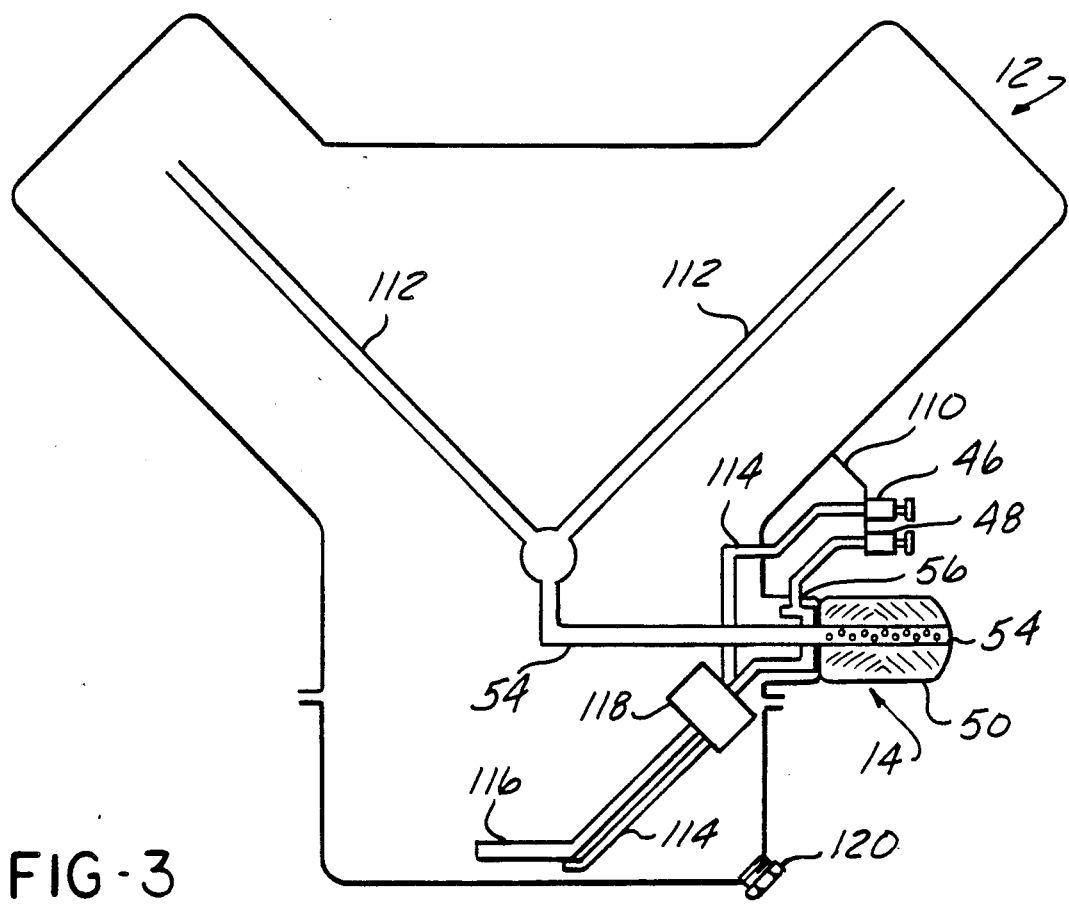
FIG. 3 is a schematic view of another preferred mounting of plumbing connections to a conventional oil filter position.

With reference now to FIG. 3, a second preferred means of coupling the oil changing apparatus 10 to the internal combustion engine 12 is there shown. Quick disconnect couplings 46, 48 are shown attached to the engine 12 by bracket 110. Bracket 110 is easily connected externally of the engine 12 by any well known means such as welding. It is envisioned that bracket 110 may be a standard engine element at some point in the future.

Oil filter 14 is mounted as previously described and shown in FIG. 2. Fluid passage 54 is in fluid communication with first external outlet fluid passage 56. Fluid passage 56 is fluidly connected to quick disconnect coupling 48 and supported by bracket 110. Clean oil from the oil changing apparatus 10 is dispersed into the engine 12 through fluid passage 56 into the oil filter 14 and travels into the lubricating passages 112 via fluid passage 54. After the engine oil drains downward into the oil pan and pickup area 116, the oil pump 118 pumps oil back through the lubricating passages 54, 112.

Quick disconnect coupling 46 is fluidly connected to outlet drain line passage 114. Outlet passage 114 is used by the oil changing apparatus to remove the old oil from the engine 12 and flush the system if desired. Oil plug 120 may also be removed to assist in draining the oil from the bottom of the engine.

While the invention has been described in detail, it will be apparent to those skilled in the art that the disclosed invention may be modified. Therefore, the foregoing description is to be considered exemplary, rather than limiting and the true scope of the invention is that defined in the following claims.

I claim:

1. An apparatus for changing oil in an internal combustion engine having an internal oil lubrication system, an oil filter and an oil reservoir, the apparatus comprising:
    means for evacuating fluid from said oil filter into said oil reservoir;
    means for removing fluid from said oil reservoir; and
    means for introducing fluid into said oil reservoir through said oil filter and internal oil lubrication system;
    wherein said fluid introducing means comprises a first fluid passage for delivering oil from said changing apparatus to said oil filter extending through said engine to said internal lubrication system.

2. The apparatus of claim 1, said fluid introducing means further comprising coupling means for coupling said changing apparatus to said internal lubrication system.

3. The apparatus of claim 1, said fluid evacuating means evacuates said fluid from said internal lubrication system through said oil filter and said first fluid passage.

4. The apparatus of claim 1 wherein said first fluid passage is cast as part of said internal combustion engine.

5. The apparatus of claim 1 wherein the drain line for evacuating the used oil is incorporated in a crank case of said combustion engine.

6. The apparatus of claim 1, further comprising:
    means for recirculating fluid from said oil reservoir through said first fluid passage into said oil filter and the drain line.

7. The apparatus of claim 6, further comprising:
    valve means for selectively communicating the first fluid passage with the fluid introducing means and the fluid evacuating means.

8. The apparatus of claim 1, said fluid evacuating means comprising:
    a source of compressed air;
    fluid passage means interconnecting the source of compressed air with said internal oil lubrication distribution system at a position upstream of said oil filter; and
    valve means for controlling communication of the source of compressed air with said internal oil lubrication distribution system.

9. The apparatus of claim 8, said fluid removing means further comprising:
    pump means for drawing fluid from said oil reservoir of said internal combustion engine; and
    fluid passage means for connecting the pump means in fluid communication with an interior of said oil reservoir of said internal combustion engine to said special oil filter and drain mounting bracket.

10. The apparatus of claim 1, said fluid introducing means comprising:
    pump means for delivering fluid into said oil reservoir of said internal combustion engine through said first fluid passage to said oil filter into said internal lubrication system.

11. The apparatus of claim 6, said fluid circulating means comprising:
   first fluid passage means in fluid communication with said internal lubrication system; and
   pump means for drawing fluid from said oil reservoir through a second fluid passage means and for discharging pressurized fluid;
   said first fluid passage means connecting the pressurized discharge from the pump means to said oil changing apparatus at a point upstream of said oil filter.

12. An apparatus for changing oil in an internal combustion engine having an internal oil lubrication system, an oil filter and an oil reservoir, the apparatus comprising:
   fluid supply passage means having a disengageable fluid connection with said internal oil lubrication system at an opening in said internal combustion engine at a position upstream of said oil filter;
   fluid withdrawal passage means having a disengageable fluid connection in fluid communication with a lower most portion of said oil reservoir of said internal combustion engine;
   first fluid supply passage means connectible with an external storage receptacle;
   first fluid discharge passage means connectible with an external storage receptacle;
   pump means having inlet passage means and outlet passage means;
   first valve means for selectively connecting said inlet passage means with said fluid withdrawal passage means and with said first fluid supply passage means; and
   second valve means for selectively connecting said outlet passage means with said fluid supply passage means to said internal combustion engine and with said first fluid discharge passage means.

13. The apparatus of claim 12, further comprising:
   compressed air supply passage means for evacuating fluid from said oil filter; and
   third valve means for selectively connecting said fluid supply passage means to said internal combustion engine with said outlet passage means of said pump means downstream from said second valve means and for connecting said fluid supply passage means to said internal combustion engine with said compression air supply passage means.

14. The apparatus of claim 13, further comprising:
   second fluid supply passage means connectible with a second external storage receptacle; and
   second pump means having an inlet passage in fluid communication with said second fluid supply passage means and a discharge passage in fluid communication with said fluid supply passage means to said internal combustion engine.

* * * * *